Figure 1:
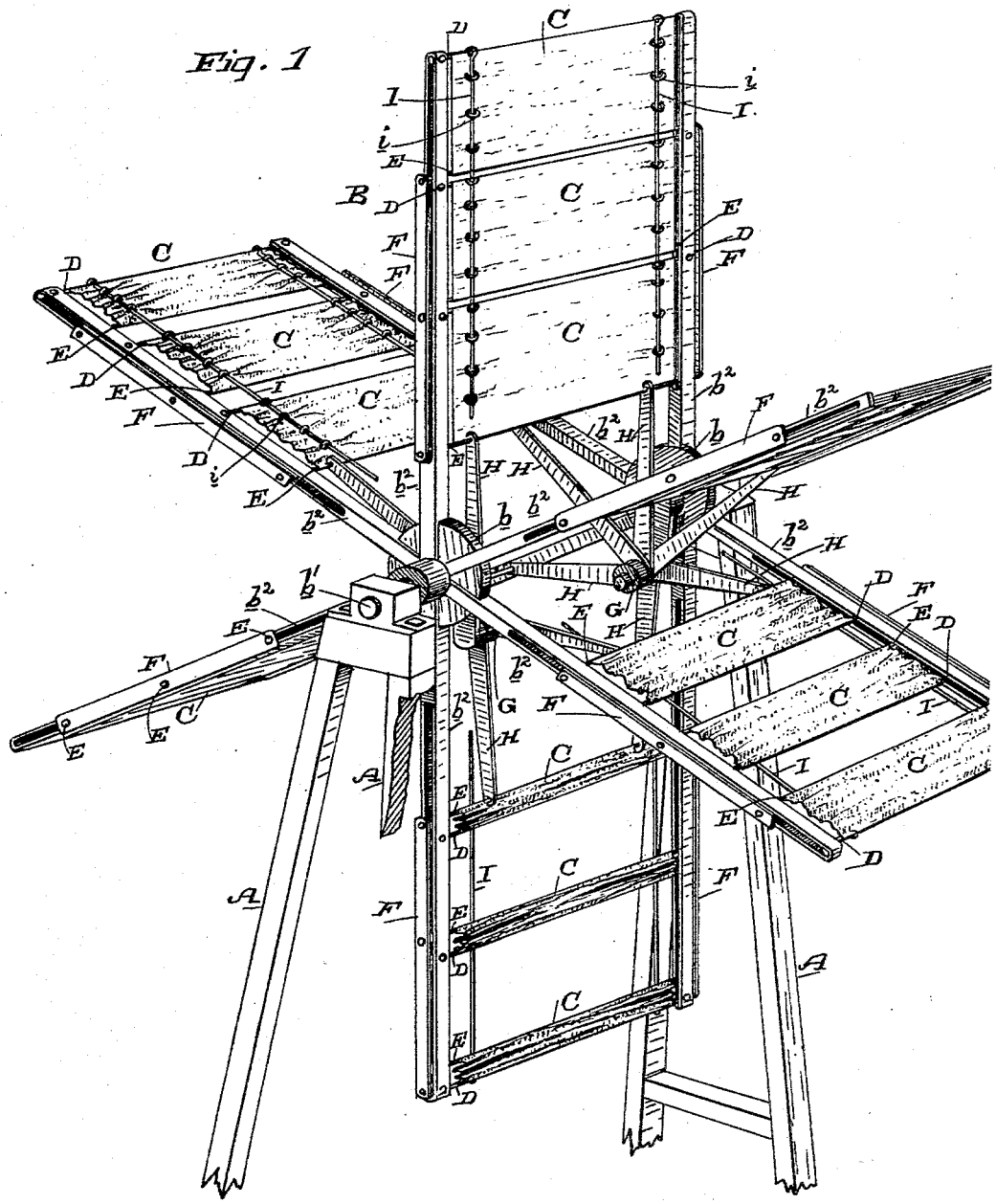

(No Model.) 2 Sheets—Sheet 1.

J. D. KELLER.
WIND WHEEL.

No. 412,099. Patented Oct. 1, 1889.

Witnesses,
Geo. H. Strong

Inventor,
John D. Keller
By Dewey & Co.
Att'ys

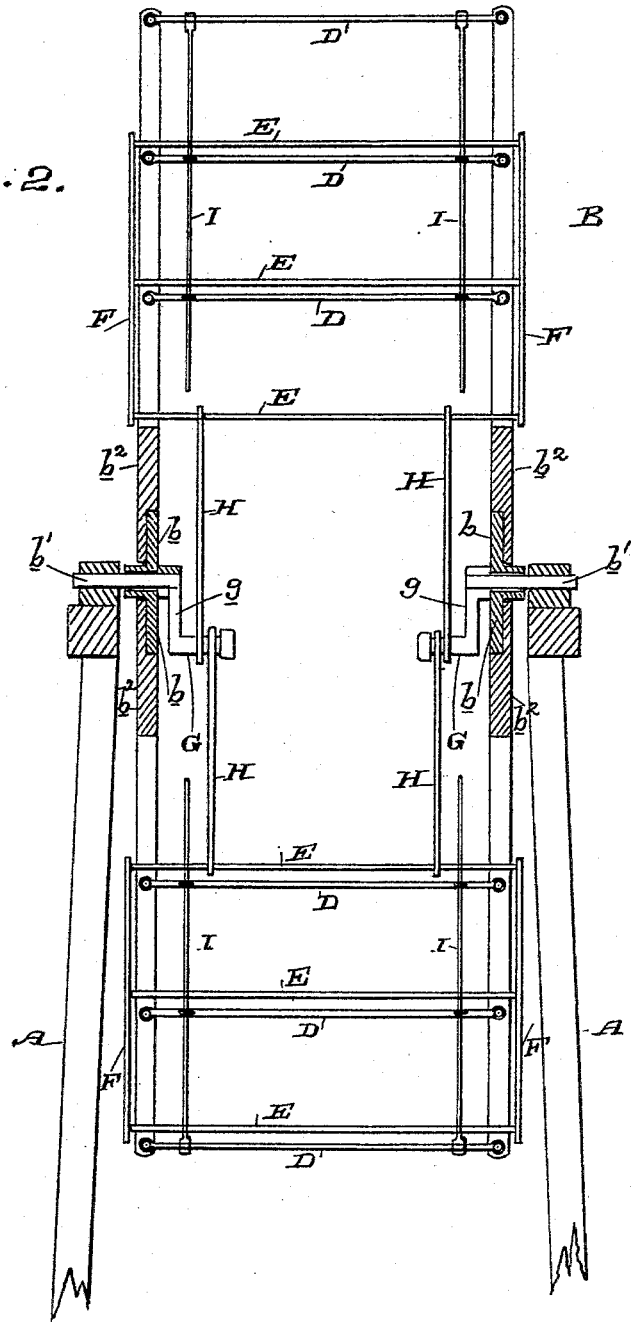

UNITED STATES PATENT OFFICE.

JOHN DOMINIK KELLER, OF SAN FRANCISCO, CALIFORNIA.

WIND-WHEEL.

SPECIFICATION forming part of Letters Patent No. 412,099, dated October 1, 1889.

Application filed May 15, 1889. Serial No. 310,894. (No model.)

*To all whom it may concern:*

Be it known that I, JOHN DOMINIK KELLER, of the city and county of San Francisco, State of California, have invented an Improvement in Wind-Wheels; and I hereby declare the following to be a full, clear, and exact description of the same.

My invention relates to the class of wheels especially adapted to be operated by wind-power; and my invention consists in the hereinafter-described novel constructions and arrangements whereby the blades, wings, or fans of the wheel are made to open to catch the wind above and to close up in coming against the wind below.

The object of my invention is to provide a wheel of this class which by reason of its adjustable blades or wings shall present as little surface in coming against the wind below as possible, thereby reducing the resistance to its rotation, and which shall, when in the wind above, spread its blades out to their full capacity for taking all the wind.

Referring to the accompanying drawings for a more complete explanation of my invention, Figure 1 is a perspective view of my wind-wheel. Fig. 2 is a vertical section, the wings, blades, or fans C being omitted.

A represents any suitable frame, tower, or other support for the wheel.

B designates the wheel generally, said wheel being made up of a hub-plate $b$ on each side, having projecting shafts $b'$, by which the wheel is mounted. Arms $b^2$ project radially from these hubs, said arms being here shown as slotted or forked at their outer ends.

C are the blades, wings, or fans of the wheel. They consist of strips of suitable flexible material or fabric, or of frames made up so that they may be folded. I have here shown them as being made of some suitable fabric. One end of each blade or wing is attached to a cross-rod D, which extends between the arms $b^2$ of the wheel, said bars being rigidly connected with the arms and here shown as being in a series of three in each set of arms, though it is obvious that they may be of a less or greater number, if desired. The other edges of these blades or wings are securely attached to sliding cross-rods E, which pass through the slotted outer ends of these arms $b^2$, and are thereby guided. The ends of these rods are secured to connecting-bars F, which lie upon the outer side of the arms $b^2$, and these bars connect the sliding cross-rods in sets of three or more, as may be desired.

G are pins, which are located off the center of the wheel, and are here shown as supported by means of depending arms or brackets $g$ from the shaft-boxes of the main wheel, though other means may be employed for supporting them. These pivotal pins G are lower than the centers of the wheel, and upon them are pivoted the arms H, the outer ends of which are connected with the innermost sliding cross-rod E of each series.

The operation of the wheel is as follows: As it rotates and the blades or wings successively approach a vertical position above, the sliding cross-rods E are all drawn downwardly to their lowermost limits, thereby expanding or stretching the wings or blades to their utmost capacity, and as they pass the upper vertical position the cross-rods E move radially outward, thereby closing up or folding the wings or blades until they reach the lower vertical position, when said rods are forced outwardly to their farthest limit and completely fold the wings or blades. This movement is an eccentric one, and is due, as is obvious, to the different centers of the wheel and the actuating-arms H.

In order to prevent the wings or blades from bagging when closed, I attach to them a number of rings $i$ and pass through said rings the rods I, which are securely attached to the rigid cross-rods D of the arms $b^2$. Therefore, as the wings or blades fold they crumple up on said fixed rods I and are prevented from bagging, so that they do not catch the wind in coming up into it.

It is obvious that my invention is not necessarily confined to a wind-wheel, as the same mechanism may be employed for adjusting and feathering the blades of paddle-wheels.

I have not deemed it necessary herein to show any power-transmitting connections from the wheel, as these do not concern my invention.

Having thus described my invention, what I claim as new, and desire to secure by Letters Patent, is—

1. In a wind-wheel, a series of flexible blades, fans, or wings attached at one end firmly to the wheel, pivoted radial arms, the centers of which are eccentric to the center of the wheel, and connections between said arms and the other ends of the blades, fans, or wings, whereby as the wheel rotates said blades, fans, or wings successively open out and fold up, substantially as described.

2. In a wind-wheel, the combination of the series of radial arms $b^2$ of said wheel, having fixed cross-rods D, flexible or folding wings, fans, or blades secured by one edge to said cross-rods, a series of rotary arms H, the centers of which are eccentric to the center of the wheel, and sliding cross-rods E, connected with said arms and with the other edge of the wings, fans, or blades, whereby the latter successively expand and fold up as the wheel rotates, substantially as described.

3. In a wind-wheel, the combination of the wheel B, consisting of the hubs and radial slotted arms $b^2$, the fixed cross-rods D between each pair of arms, the flexible or folding wings, fans, or blades C, having one edge attached to said fixed cross-rods, the series of arms H, having pivotal centers located eccentrically to the center of the wheel, the sliding cross-rods E, fitted and guided in the slotted arms of the wheel and connected with the eccentric-arms, and the connecting-bars F, uniting the sliding rods of each series, substantially as described.

4. In a wind-wheel, the combination of the wheel B, having radial arms $b^2$, the fixed cross-rods D, secured to the radial arms, the flexible or folding wings, fans, or blades C, secured by one edge to said fixed rods, the series of arms H, having pivotal centers located eccentrically to the center of the wheel, the sliding cross-rods E, to which the other edges of the wings, fans, or blades are secured, said rods being connected with the arms H, the fixed rods I, secured to rods D, and the rings $i$, secured to the wings, fans, or blades and fitted to slide on the rods I, substantially as described.

In witness whereof I have hereunto set my hand.

JOHN DOMINIK KELLER.

Witnesses:
S. H. NOURSE,
J. H. BLOOD.